United States Patent
Brezina et al.

(10) Patent No.: US 6,733,188 B2
(45) Date of Patent: May 11, 2004

(54) OPTICAL ALIGNMENT IN A FIBER OPTIC TRANSCEIVER

(75) Inventors: Johnny R. Brezina, Austin, TX (US); Christopher M. Gabel, Rochester, MN (US); Brian M. Kerrigan, Austin, TX (US); Benjamin M. Kreuz, Austin, TX (US); Roger T. Lindquist, Dodge Center, MN (US); Gerald D. Malagrino, Jr., Rochester, MN (US); James R. Moon, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/007,027

(22) Filed: Nov. 5, 2001

(65) Prior Publication Data

US 2003/0086662 A1 May 8, 2003

(51) Int. Cl.$^7$ ................................................ G02B 6/36
(52) U.S. Cl. .............................. 385/91; 385/90; 385/93
(58) Field of Search .......................... 385/93, 52, 89, 385/90

(56) References Cited

U.S. PATENT DOCUMENTS

| | | | | |
|---|---|---|---|---|
| 5,231,686 A | * | 7/1993 | Rabinovich | 385/93 |
| 5,537,503 A | * | 7/1996 | Tojo | 385/93 |
| 6,205,266 B1 | * | 3/2001 | Palen | 385/15 |
| 6,278,674 B1 | * | 8/2001 | Araki | 369/54 |
| 2002/0021874 A1 | * | 2/2002 | Giboney | 385/90 |
| 2002/0136504 A1 | * | 9/2002 | Boscha | 385/91 |

OTHER PUBLICATIONS

U.S. Patent Application entitled "Packaging Architecture for a Multiple Array Transceiver Using a Continuous Flexible Circuit", (Inventors Johnny R. Brezina, et al.).
U.S. Patent Application entitled "Apparatus and Method for Controlling an Optical Transceiver", (Inventors Johnny R. Brezina, et al.).
U.S. Patent Application entitled "Mounting a Lens Array in a Fiber Optic Transceiver", (Inventors Johnny R. Brezina, et al.).

* cited by examiner

*Primary Examiner*—Drew A. Dunn
*Assistant Examiner*—Leo Boutsikaris
(74) *Attorney, Agent, or Firm*—Cardinal Law Group; Casimer K. Salys

(57) ABSTRACT

The present invention provides methods for aligning a fiber optic cable with an optical component on a device carrier using a fiber optic lens assembly. One method provides that movement of the lens assembly is fixed with respect to the fiber optic cable. Light is sent through the lens assembly. The fixed lens assembly and fiber optic cable are moved with respect to the device carrier. The light sent though the fixed lens assembly is monitored, and movement of the fixed lens assembly is fixed with respect to the device carrier according to the monitored light. Another method provides that movement of the lens assembly is fixed with respect to the device carrier. Light is sent through the lens assembly. The fixed lens assembly and device carrier are moved with respect to the fiber optic cable. The light sent though the fixed lens assembly is monitored, and movement of the fixed lens assembly is fixed with respect to the fiber optic cable according to the monitored light. The present invention further provides aligned transceiver assemblies having a fiber optic cable, device carrier, and fiber optic lens assembly having features that facilitate alignment and fixing according to the invention methods.

22 Claims, 6 Drawing Sheets

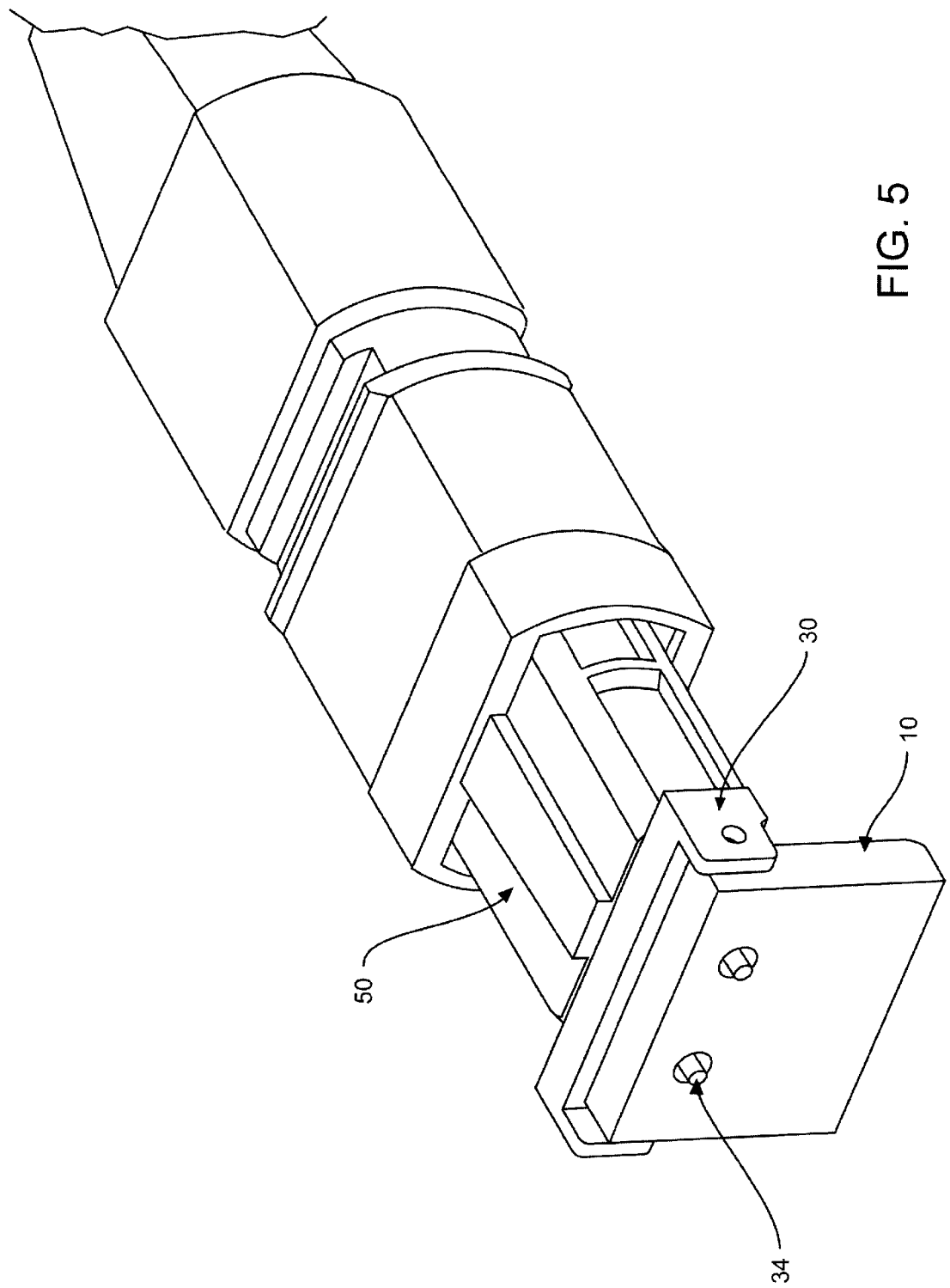

OPTICAL ALIGNMENT IN A FIBER OPTIC TRANSCEIVER

RELATED APPLICATIONS

This application claims priority to U.S. patent application Ser. No. 09/956,771 filed on Sep. 20, 2001 entitled "Fiber Optic Transceiver, Connector, And Method of Dissipating Heat" by Johnny R. Brezina, et al., the entire disclosure of which is incorporated by reference, herein.

This application also relates to the following applications, filed concurrently herewith:

"Optical Alignment In A Fiber Optic Transceiver", by Johnny R. Brezina, et al. Ser. No. 101007,027;

"External EMI Shield For Multiple Array Optoelectronic Devices", by Johnny R. Brezina, et al. Ser. No. 101006,644;

"Packaging Architecture For A Multiple Array Transceiver Using A Continuous Flexible Circuit", by Johnny R. Brezina, et al. Ser. No. 101007,026;

"Flexible Cable Stiffener for An Optical Transceiver", by Johnny R. Brezina, et al. Ser. No. 101007,028;

"Enhanced Folded Flexible Cable Packaging for Use in Optical Transceivers, by Johnny R. Brezina, et al. Ser. No. 101006,836;

"Apparatus and Method for Controlling an Optical Transceiver", by Johnny R. Brezina, et al. Ser. No. 101007,024;

"Internal EMI Shield for Multiple Array Optoelectronic Devices", by Johnny R. Brezina, et al. Ser. No. 101006,834;

"Multiple Array Optoelectronic Connector with Integrated Latch", by Johnny R. Brezina, et al. Ser. No. 101007,023;

"Mounting a Lens Array in a Fiber Optic Transceiver", by Johnny R. Brezina, et al. Ser. No. 101006,837;

"Packaging Architecture for a Multiple Array Transceiver Using a Flexible Cable", by Johnny R. Brezina, et al. Ser. No. 101006,835;

"Packaging Architecture for a Multiple Array Transceiver Using a Flexible Cable and Stiffener for Customer Attachment", by Johnny R. Brezina, et al. Ser. No. 101006,838;

"Packaging Architecture for a Multiple Array Transceiver Using a Winged Flexible Cable for Optimal Wiring", by Johnny R. Brezina, et al. Ser. No. 101006,839; and "Horizontal Carrier Assembly for Multiple Array Optoelectronic Devices", by Johnny R. Brezina, et al. Ser. No. 101007,215.

TECHNICAL FIELD OF THE INVENTION

The present invention relates generally to computer systems and in particular to optical alignment in a fiber optic transceiver.

BACKGROUND OF THE INVENTION

Single and multiple lens array fiber optic transceiver devices require precise optical component to fiber alignment for optimal function. The devices may include optical laser and/or photodetector components each coupled to a distinct optical fiber through a lens assembly. The alignment process generally involves adjusting a laser light beam path from an optical fiber or laser to a receiving photodetector or optical fiber element, respectively. The typical optical alignment tolerance for a 62.5 micron diameter fiber using a lens array is on the order of only plus or minus 5 microns. Thus, alignment considerations are essential in the design and assembly of fiber optic transceiver devices.

Two distinct methods are known for aligning optical laser and photodetector component devices to their corresponding fibers, active and passive alignment. Active alignment utilizes the laser component in an active state at a sub-assembled stage of the device. Once the laser is activated, the optical elements (laser photodetector components, lens assembly, and fiber optic cable) are moved in a lateral plane (orthogonal to the optical path) while a photoreceiver input is monitored to establish maximal light throughput intensity. After the light throughput is optimized, the individual elements are mechanically fixed to one another to maintain alignment. This procedure allows for the precise alignment of the optical elements. Current active alignment procedures, however, typically require numerous and expensive components needed during a multi-step alignment process. For example, the optical elements must all be manipulated separately to achieve proper alignment.

Passive alignment typically involves manufacturing the transceiver elements affecting the optical path to very high tolerances. This method allows for the optical alignment of the transceiver devices without monitoring laser throughput and performing the multiple-step alignment procedure. The high tolerances required for passively aligned transceivers, however, may complicate their design and increase manufacturing time and cost.

Therefore, it would be desirable to provide optical alignment in a fiber optic transceiver that would overcome the aforementioned and other disadvantages.

SUMMARY OF THE INVENTION

One aspect of the present invention provides alternative methods for aligning a fiber optic cable with optical components on a device carrier through an intervening fiber optic lens assembly. At least one optical component, such as a laser and/or photodetector, and at least one electrical component, such as a laser drive amplifier and/or transimpedence amplifier, is attached to the device carrier. The lens assembly may include a single lens or a multiple lens array. The alignment process begins by fixing the lens assembly with respect to the fiber optic cable (with a plurality of pins and/or retention clips), in a first method, or fixing the lens assembly with respect to the device carrier (with a plurality of pins and/or an adhesive), in a second method. Light, which may be provided by a laser device attached to the device carrier, is then sent through the composite. The lens assembly with fixed fiber optic cable is moved with respect to the device carrier in the first method. The lens assembly with fixed device carrier is moved with respect to the fiber optic cable in the second method. The movement may angle a laser beam path from an optical centerline. The light sent through the composite is monitored thereby facilitating channel throughput optimization. The movement of the lens assembly is then fixed with respect to the device carrier, in the first method, or is then fixed with respect to the fiber optic cable, in the second method, according to the monitored light.

Another aspect of the present invention provides aligned transceiver assemblies having a fiber optic cable, device carrier, and fiber optic lens assembly having features that facilitate alignment and fixing according to the invention methods.

The foregoing and other features and advantages of the invention will become further apparent from the following detailed description of the presently preferred embodiments, read in conjunction with the accompanying drawings. The detailed description and drawings are merely illustrative of the invention, rather than limiting, the scope of the invention being defined by the appended claims and equivalents thereof.

BRIEF DESCRIPTION OF THE DRAWINGS

FIG. 5 is an alternative elevated view of the assembly of FIG. 3 with an associated fiber optic cable made in accordance with the present invention.

DETAILED DESCRIPTION OF THE PRESENTLY PREFERRED EMBODIMENTS

The present invention is shown and described by the following figures and description of multiple array transceiver assembly and alignment. Those skilled in the art will recognize that the invention is not limited to the 2.5 gigahertz, 4-channel multiple array transceiver assembly disclosed. For example, the invention may be adapted to a single fiber optic array as well as numerous multiple channel fiber optic arrays. In the following description, an axial direction is defined as a direction parallel to light traveling through optical components in the multiple array transceiver assembly. Furthermore, a radial direction is defined as a direction orthogonal to the lateral direction.

Figure 1:
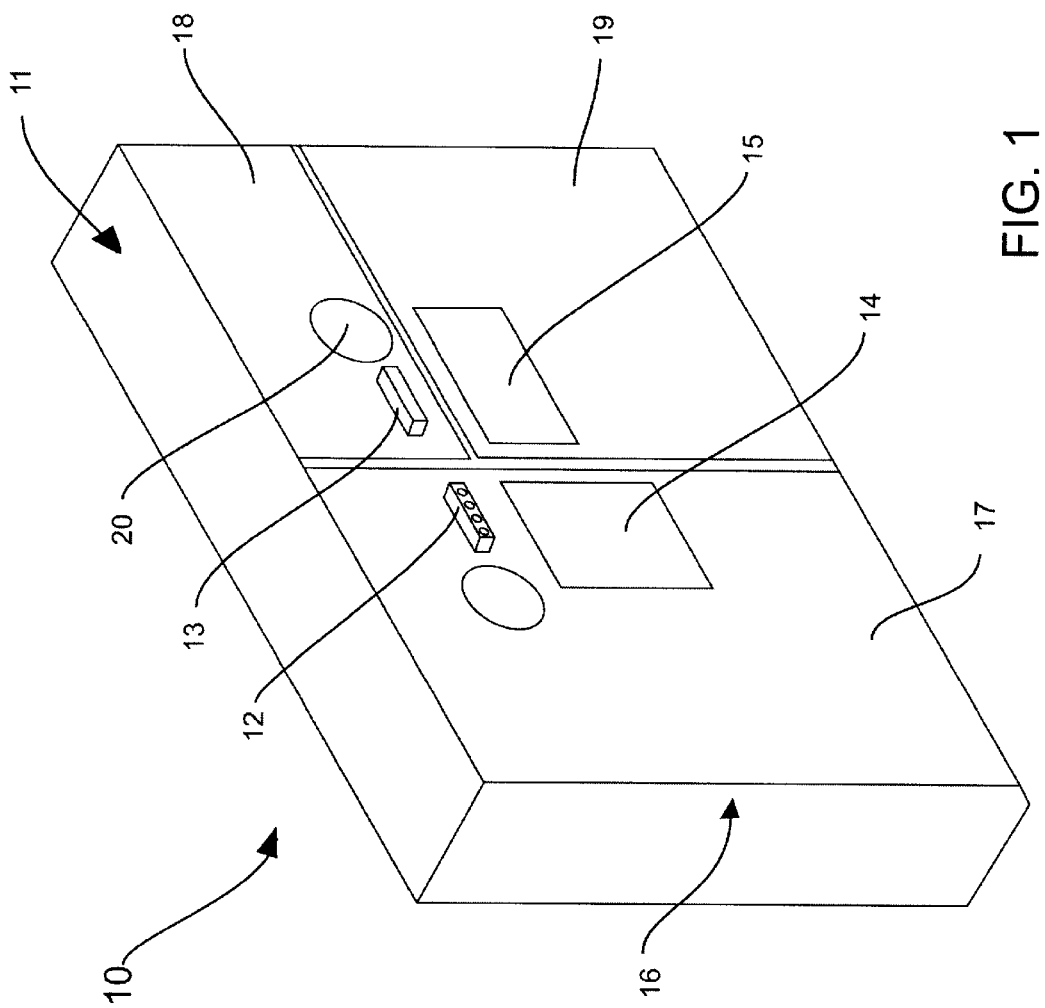
FIG. 1 is an elevated view of a device carrier made in accordance with the present invention.

FIG. 1 is an elevated view of a device carrier 10 made in accordance with the present invention. The device carrier 10 may include optical and electronic components disposed on a common substrate 11. The optical components may include a laser die 12 and a photodetector die 13. The electronic components may include a laser drive amplifier (LDA) chip 14 and a transimpedance amplifier (TIA) chip 15. The common substrate 11 may be made of any material with good thermal conductivity, such as copper, aluminum nitride, or the like. The common substrate 11 may have a planar face 16 to create a common initial plane for mounting the components, particularly, to allow precise mounting of the optical components. The substrate face 16 may be divided into three electrically isolated gold lands: laser and LDA ground reference land 17, photodetector voltage land 18, and TIA ground reference land 19. This land arrangement meets the requirements of the particular optical and electronic component, i.e., the laser, LDA, and TIA chips require a ground plane for attachment on chip backing, and the photodetector chip requires a voltage plane for attachment on chip backing. In one embodiment, the lands may be made of gold sputtered or diffused onto the substrate face 16.

The laser die 12 and LDA chip 14 may be positioned on the laser and LDA ground reference land 17. The TIA chip 15, used as a photodetector interface, may be positioned on the TIA ground reference land 19. The photodetector die 13 may be positioned on the photodetector voltage land 18. The precise positioning of the laser die 12 and photodetector die 13 provides means for passively aligning the two optical components on the device carrier 10. The LDA chip 14 and TIA chip 15 may be positioned in close proximity to the laser die 12 and photodetector die 13, respectively, to provide short critical transmission interconnection wire bond lengths.

The laser die 12 and photodetector die 13 may then be attached to the common substrate 11 by using standard electrically conductive epoxy used for die attachment, gold to gold-tin alloy reflow, or similar methods familiar to those skilled in the art. The LDA chip 14 and TIA chip 15 may be die bonded to the common substrate 11 as recognized in the art. Two apertures 20 may be formed through the common substrate 11 to receive alignment pins projecting from a fiber optic lens assembly. The carrier apertures 20 may additionally provide means for referencing the position of the laser die 12 and photodetector die 13 on the substrate face 16.

The laser die 12 and photodetector die 13 and their associated electronic components may convert an electrical signal from the device carrier 10 to a light signal or convert a light signal coming into the device carrier 10 to an electrical signal, respectively. In other embodiments, some of the optical and electronic components above may be omitted from the device carrier 10, or additional or alternative components may be included. For example, the optical components may be lasers only, so that the device carrier 10 only transmits optical signals. Alternatively, the optical components may be photodetectors only, so that the transceiver only receives optical signals. The number of lasers and photodetectors may be predetermined to meet the number of transmit and receive channels desired.

Figure 2A:
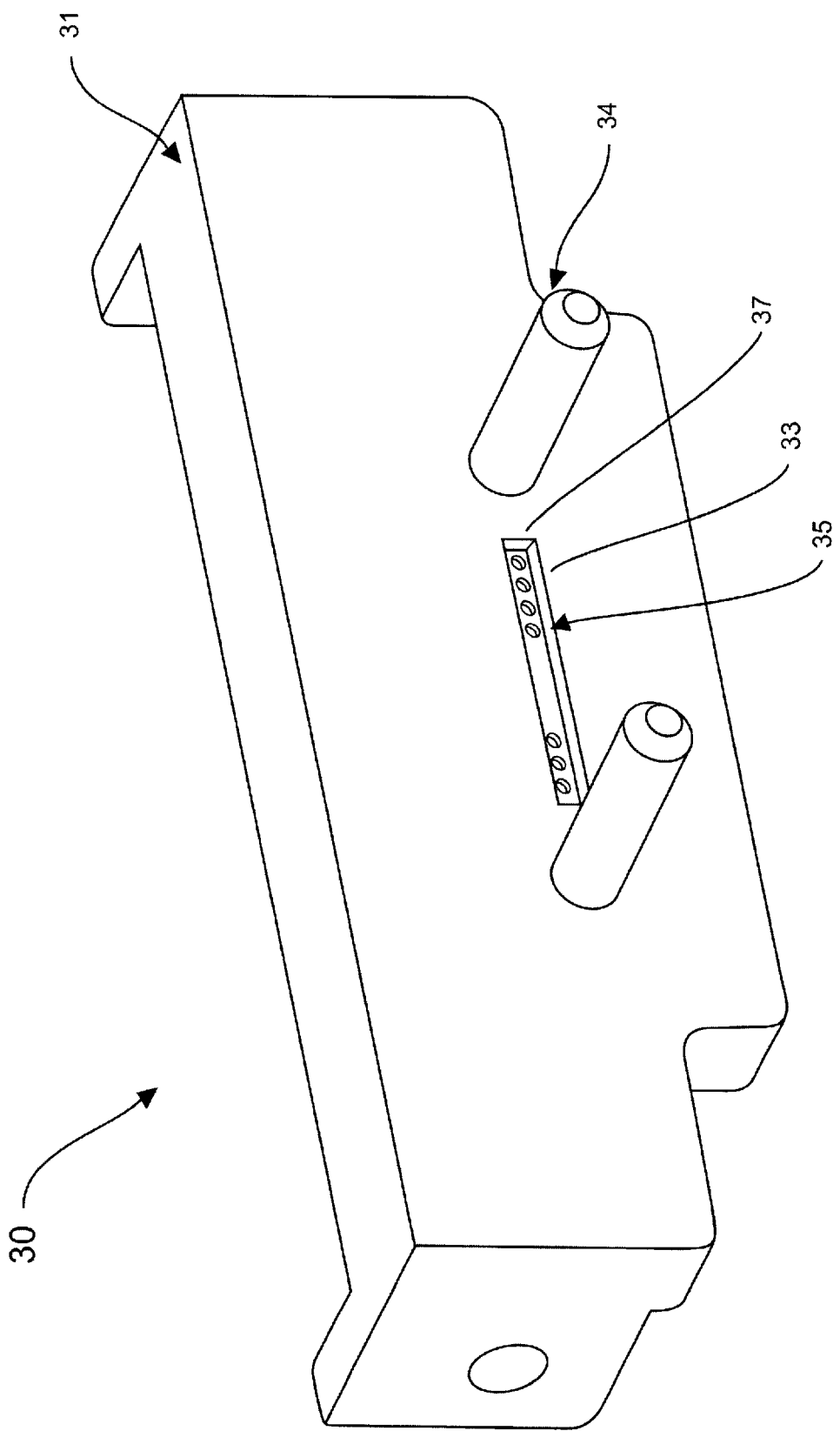
FIGS. 2A & 2B are alternative elevated views of a fiber optic lens assembly made in accordance with the present invention.
Figure 2B:
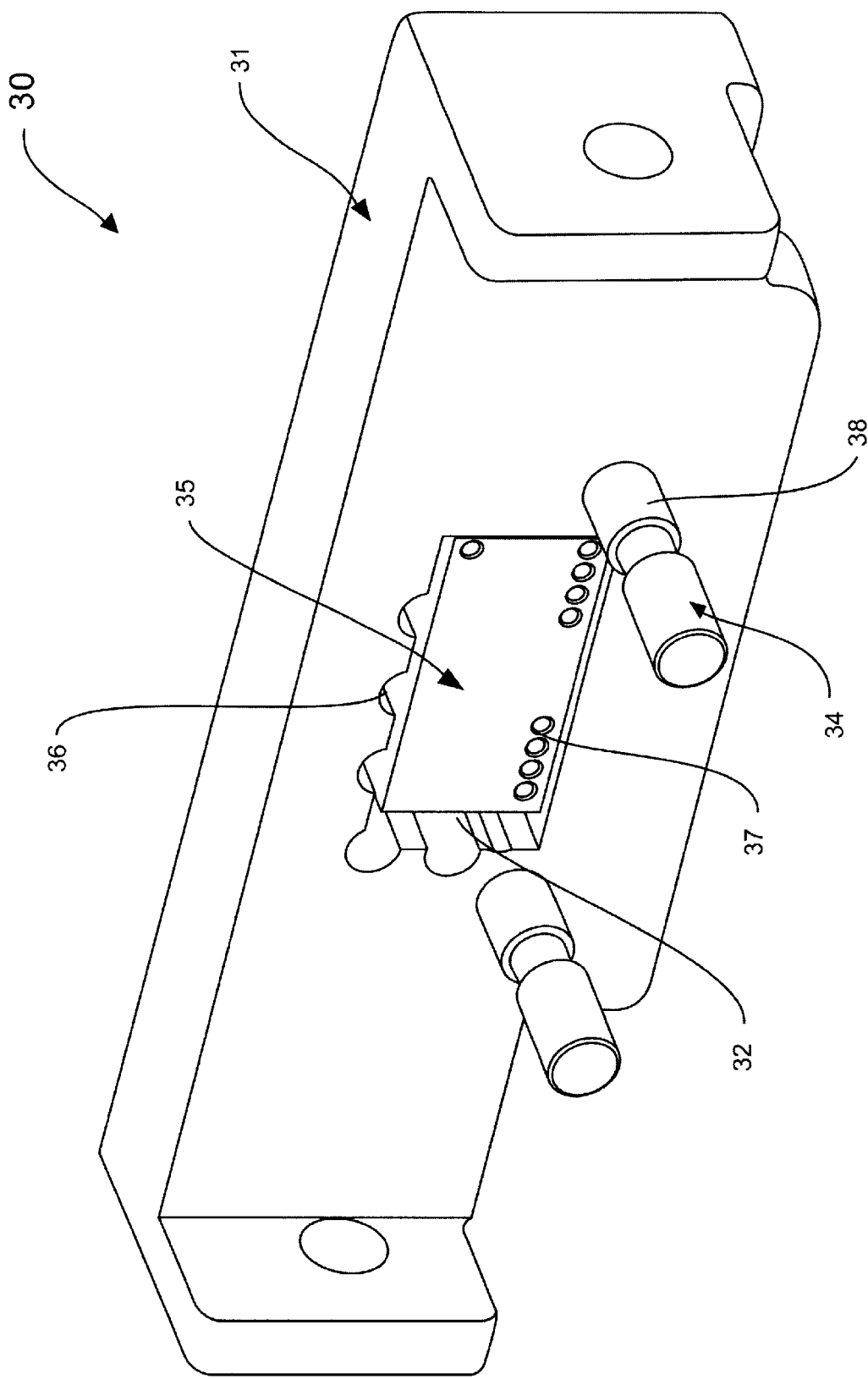

FIGS. 2A & 2B, in which like elements have like reference numbers, are alternative elevated views of a fiber optic lens assembly 30 made in accordance with the present invention. The lens assembly 30 may be used to couple the light signal between optical components on a device carrier and a fiber optic cable. The lens assembly 30 enables higher light transfer coupling efficiency through the ability of a lens to focus light divergence and convergence of input and output optical channel signals.

FIG. 2A shows the fiber optic lens assembly 30 from the direction of where the fiber optic cable may be attached. FIG. 2B shows the fiber optic lens assembly 30 from the direction of where the device carrier may be attached. The lens assembly 30 may include a molded housing 31 having a optical lens array mounting aperture 32, lens aperture 33, and alignment pins 34. An optical lens array 35 may be retained within the mounting aperture 32 using a combination of retaining features 36 and a UV curable adhesive. In one embodiment, the retaining features 36 may include a plurality of housing projections and elastomeric members to provide optical lens array 35 to pin 34 alignment accuracy of approximately plus or minus 16 microns in the lateral plane, the plane orthogonal to the light path. The relative thickness of the molded housing 31 and lens aperture 33 allows a proper distance between the optical components on the device carrier and the fiber optic cable to focus light using the optical lens array 35.

The optical lens array 35 may be made of a fused silica, polymer, or other suitable optical material that is etched to create lens prescriptions in an array pattern, including symmetrical and asymmetrical lens designs. The optical lens array 35 may provide a plurality of lenses 37, one lens for each input and output optical channel in the multiple array transceiver assembly. Lenses 37 are aligned with the lens aperture 33. The alignment pins 34 may each include a relief 38 to provide a volume for adding a curable adhesive during transceiver assembly.

Figure 3:
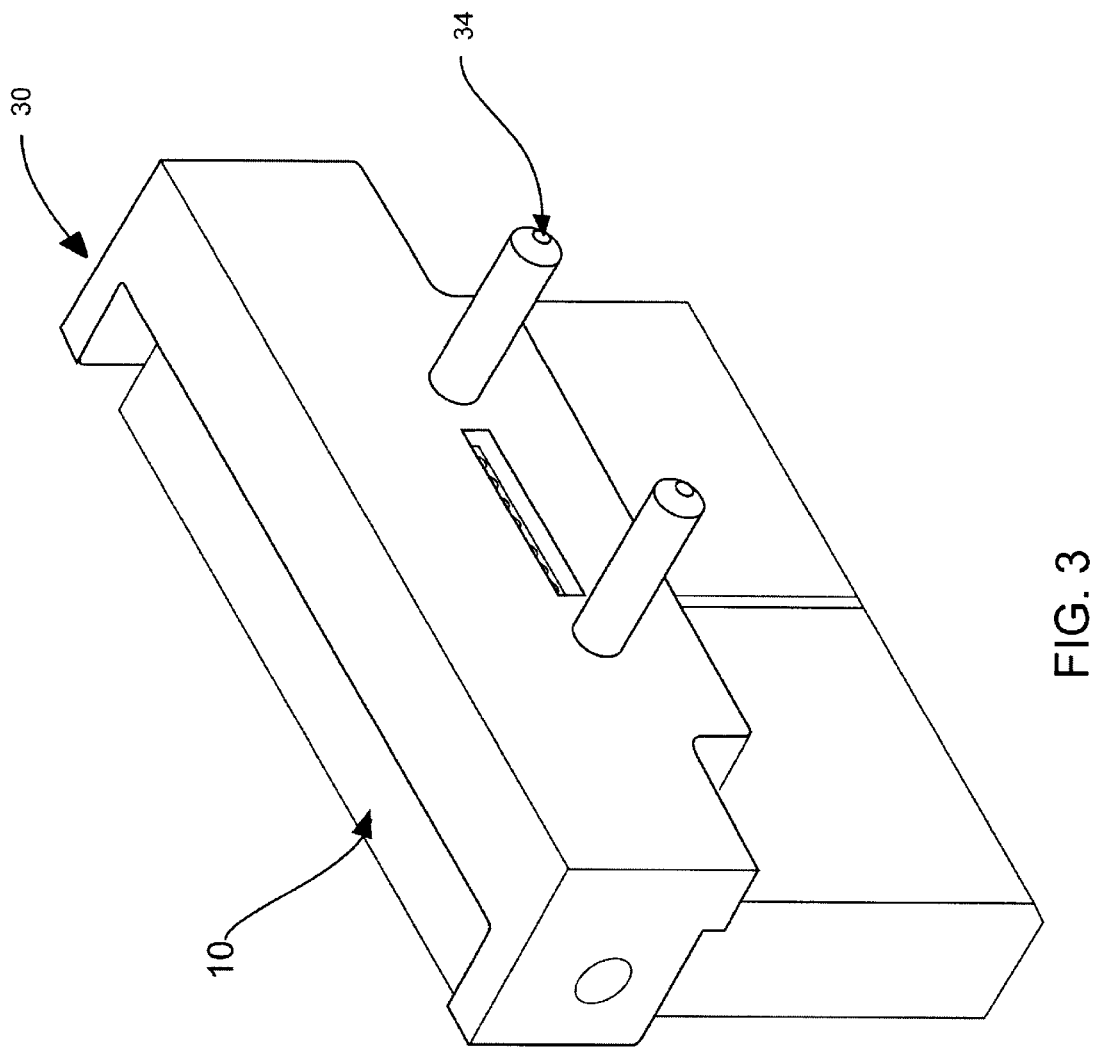
FIG. 3 is an elevated view of a device carrier and associated fiber optic lens assembly made in accordance with the present invention.
Figure 4:
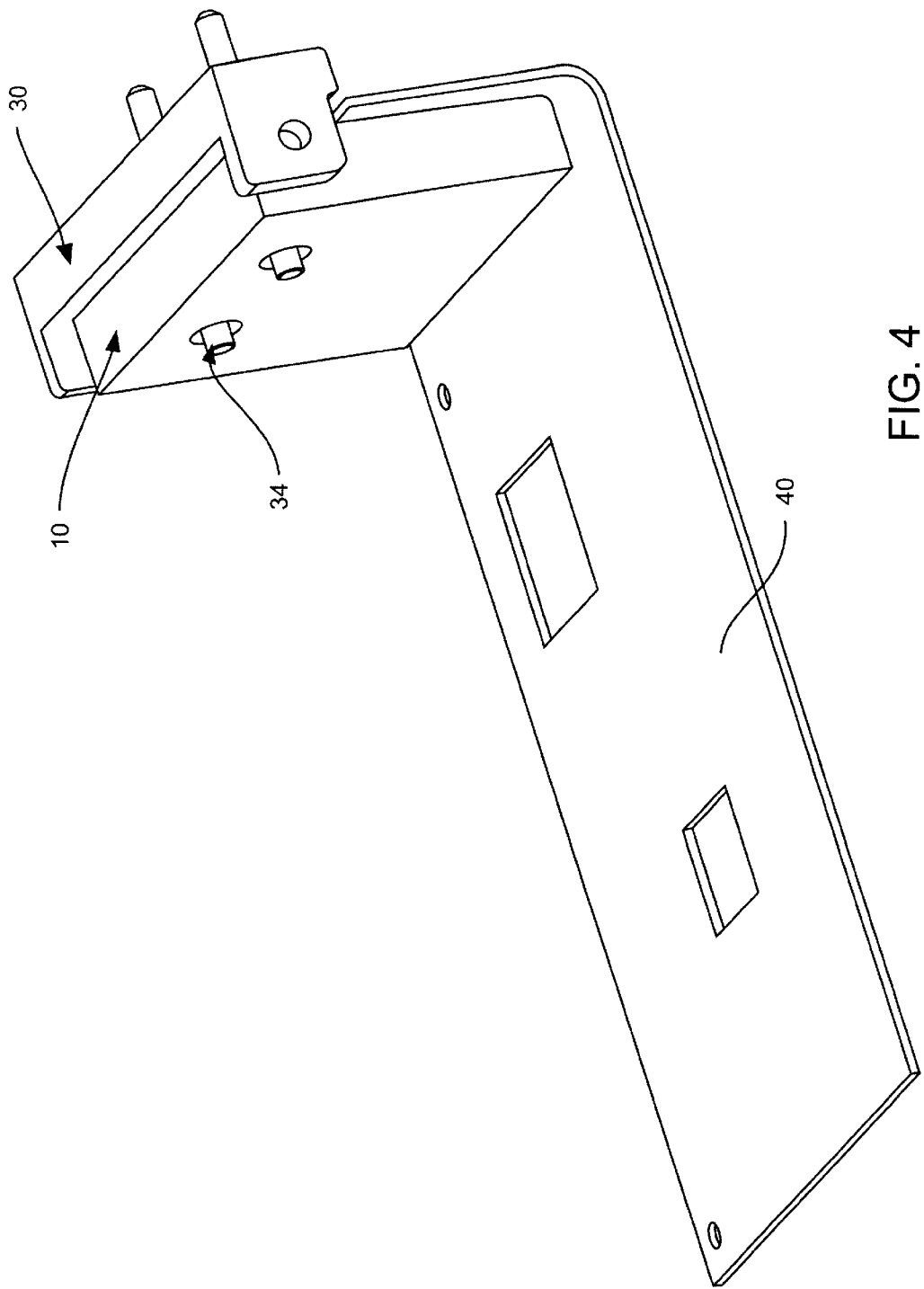
FIG. 4 is an alternative elevated view of the assembly of FIG. 3 with an associated flexible cable made in accordance with the present invention.

FIG. 3 is an elevated view of device carrier 10 and associated fiber optic lens assembly 30 made in accordance with the present invention. FIG. 4 is an alternative elevated view of the assembly of FIG. 3 with an associated flexible cable 40 made in accordance with the present invention. The flexible cable 40 may provide power and operable connectivity to the device carrier 10 and its associated optical and electronic components. FIG. 5 is an alternative elevated view of the assembly of FIG. 3 with an associated fiber optic cable 50 made in accordance with the present invention. The fiber optic cable 50 may be one of many fiber optic cables known in the art such as a standard MTP-type fiber optic cable. Furthermore, the fiber optic cable 50 may include at least one fiber (not shown) terminating at a fiber end for sending and receiving light.

The first method of optically aligning the fiber optic transceiver assembly involves fixing the position of the device carrier 10, and associated optical components, with respect to fiber optic cable 50 using alignment pins 34. The alignment pins 34 provide means for attaching, grossly aligning, and fixing axial movement of the fiber optic lens assembly 30 to the fiber optic cable 50 and device carrier 10. A spring feature (not shown) located in the fiber optic cable 50 may provide spring loaded compression to remove all axial direction clearance between the fiber optic cable 50 and the lens assembly 30 while allowing free "play" in the radial direction. Fiber optic cable retention clips (not shown) standard in the art are used to fix radial movement of the fiber optic lens assembly 30 with respect to fiber optic cable 50. The retention clips may include interlocking features located in both the fiber optic lens assembly 30 and fiber optic cable 50. At this point, free movement (radial and axial) is restricted between the fiber optic cable 50 and lens assembly 30 whereas free radial play is allowed between the fiber optic cable/lens assembly and the device carrier 10. Alignment is then accomplished by radial positioning of the device carrier 10.

The alignment process may further include powering on a device carrier 10 laser to send light through the lens assembly 30 and on to the fiber optic cable 50. In one embodiment, a solder ball input/output (not shown) on the flexible cable 40 allows the laser die 12 to be powered on. Each laser die 12 channel may produce an optically centered laser beam sent through the fiber optic lens assembly 30 where it is focused by an individual lens. A laser spot may be produced at a focal point on a corresponding fiber end in the fiber optic cable 50. The lens assembly 30 and fixedly attached fiber optic cable 50 may be moved in the radial direction with respect to device carrier 10. An alignment tool (not shown) standard in the art may be used to move the components relative to one another during the alignment process.

The alignment tool may move the attached lens assembly 30/fiber optic cable 50 in the radial direction following a scanning pattern. As the attached lens assembly 30/fiber optic cable 50 are moved, the laser light transmitted from the device carrier 10 may be monitored through the fiber optic cable 50 by methods standard in the art. In another embodiment, the light may be transmitted from the fiber optic cable 50 and monitored by a photodetector mounted on the device carrier 10. In the case where laser light is being transmitted from the device carrier 10, the lateral motion provided by the alignment tool causes the focused laser spot to scan across the fiber optic cable 50 fiber end(s). In essence, the lateral movement of the attached lens assembly 30/fiber optic cable 50 creates an optical means to displace the laser beam focal point with respect to the fiber end. This permits the laser spot to be moved in the radial direction with respect to the corresponding fiber. Thus, the laser spot may be precisely aligned with its corresponding fiber by slightly "angling" the optic beam from its optical centerline.

The scanning movement process is continued until laser channel throughput is optimized. Preferably, a maximum laser channel throughput from laser to fiber or from fiber to photodetector is considered optimal. Once the light throughput is optimized, the radial movement of the lens assembly 30/fiber optic cable 50 relative to the device carrier 10 may be fixed. The movement may be fixed by adding an ultraviolet cure epoxy adhesive, or similar attachment means, to a mating perimeter of the lens assembly 30 and device carrier 10. In addition, the alignment pin 34 reliefs may provide means for adding the adhesive to further fix axial movement between the fiber optic lens assembly 30 and device carrier 10.

The utilization of multiple stage gross passive alignment followed by a fine active alignment strategy allows for the precise alignment of the optical elements while reducing time and expense of standard alignment procedures. Furthermore, the described process consistently yields an optical alignment well within the tolerance of plus or minus 5 microns.

A second method of optical alignment provides an alternative alignment procedure, wherein movement of the device carrier 10 relative to the lens assembly 30 is fixed before active optical alignment with a radially moveable fiber optic cable 50. This alignment process achieves all of the benefits of the first method while allowing for methodological flexibility in the optical alignment process. The method may include mounting the device carrier 10 and the fiber optic cable 50 on the alignment pins 34, thereby fixing axial movement, followed by fixing radial movement of the device carrier 10 (i.e. with an adhesive). At this point, free movement (radial and axial) is restricted between the device carrier 10 and lens assembly 30 whereas free radial play is allowed between the device carrier/lens assembly and the fiber optic cable 50. In one embodiment, refraining from attaching the fiber optic retention clips at this point may provide means for allowing radial movement of the fiber optic cable 50 relative to the lens assembly 30.

The optical alignment process may then proceed as described for the first method. The alignment tool, however, may be used to move the attached lens assembly 30/device carrier 10 relative to the fiber optic cable 50 in the radial direction scanning pattern. Light throughput is optimized and the fiber optic cable 50 is then fixed to the lens assembly 30, in one embodiment, with the fiber optic retention clips. As with the first method, optical alignment of the multiple array transceiver is achieved.

It is important to note that the figures and description illustrate specific applications and embodiments of the present invention, and are not intended to limit the scope of the present disclosure or claims to that which is presented therein. While the figures and description present optical alignment of a 2.5 gigahertz, 4-channel transmit and 4-channel receive multiple array transceiver, the present invention is not limited to that format, and is therefore applicable to other array formats including dedicated transceiver modules, dedicated receiver modules, and modules with different numbers of channels. In addition, the described sequence of alignment need not follow the prescribed sequence in order to effectively achieve accurate optical alignment. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of aligning a fiber optic cable with an optical component on a device carrier using a fiber optic lens assembly comprising:

fixing movement of the lens assembly with respect to the fiber optic cable;

grossly positioning the fixed lens assembly and fiber optic cable with respect to the device carrier with alignment pins;

sending light through the lens assembly;

moving the fixed lens assembly and fiber optic cable with respect to the device carrier;

monitoring the light sent though the fixed lens assembly; and fixing movement of the fixed lens assembly with respect to the device carrier according to the monitored light.

2. The method of claim 1 wherein the optical component comprises at least one laser.

3. The method of claim 1 wherein the optical component comprises at least one photodetector.

4. The method of claim 1 further comprising:

mounting at least one electronic component on the device carrier; and operably attaching the electronic component to the optical component.

5. The method of claim 4 wherein the electronic component is selected from a group consisting of a laser drive amplifier and a transimpedence amplifier.

6. The method of claim 1 wherein the fiber optic lens assembly comprises an array of individual lenses.

7. The method of claim 1 wherein monitoring the light sent though the lens assembly comprises optimizing channel throughput.

8. A method of aligning a fiber optic cable with an optical component on a device carrier using a fiber optic lens assembly comprising:

fixing movement of the lens assembly with respect to the device carrier;

grossly positioning the fixed lens assembly and device, carrier with respect to the fiber optic cable with alignment pins;

sending light through the lens assembly;

moving the fixed lens assembly and device carrier with respect to the fiber optic cable;

monitoring the light sent though the fixed lens assembly; and fixing movement of the fixed lens assembly with respect to the fiber optic cable according to the monitored light.

9. The method of claim 8 wherein the optical component comprises at least one laser.

10. The method of claim 8 wherein the optical component comprises at least one photodetector.

11. The method of claim 8 further comprising:

mounting at least one electronic component on the device carrier; and operably attaching the electronic component to the optical component.

12. The method of claim 11 wherein the electronic component is selected from a group consisting of a laser drive amplifier and a transimpedence amplifier.

13. The method of claim 8 wherein the fiber optic lens assembly comprises an array of individual lenses.

14. The method of claim 8 wherein monitoring the light sent though the lens assembly comprises optimizing channel throughput.

15. A fiber optic lens assembly including a fiber optic cable and a device carrier comprising:

means for fixing movement of the lens assembly with respect to the fiber optic cable;

means for grossly positioning the fixed lens assembly and fiber optic cable with respect to the device carrier;

means for sending light through the lens assembly;

means for moving the fixed lens assembly and fiber optic cable with respect to the device carrier;

means for monitoring the light sent though the fixed lens assembly; and means for fixing movement of the fixed lens assembly with respect to the device carrier according to the monitored light.

16. The assembly of claim 15 further comprising at least one optical component operably attached to the device carrier.

17. The assembly of claim 15 further comprising means for passively aligning the device carrier.

18. The assembly of claim 15 further comprising means for angling a laser beam path from an optical centerline.

19. A fiber optic lens assembly including a fiber optic cable and a device carrier comprising:

means for fixing movement of the lens assembly with respect to the device carrier;

means for grossly positioning the fixed lens assembly and device carrier with respect to the fiber optic cable;

means for sending light through the lens assembly;

means for moving the fixed lens assembly and device carrier with respect to the fiber optic cable;

means for monitoring the light sent though the fixed lens assembly; and means for fixing movement of the fixed lens assembly with respect to the fiber optic cable according to the monitored light.

20. The assembly of claim 19 further comprising at least one optical component operably attached to the device carrier.

21. The assembly of claim 19 further comprising means for passively aligning the device carrier.

22. The assembly of claim 19 further comprising means for angling a laser beam path from an optical centerline.

* * * * *